April 5, 1932.

M. R. JENNEY

SHOCK ABSORBER

Re. 18,411

Original Filed July 9, 1925

Witness:

Alfred H. McGlinchey

Inventor:

Melvin R. Jenney by his attorneys

Van Brunt, Frick, Hildreth, & Cary

Reissued Apr. 5, 1932

Re. 18,411

UNITED STATES PATENT OFFICE

MELVIN R. JENNEY, OF MELROSE, MASSACHUSETTS, ASSIGNOR, BY MESNE ASSIGNMENTS, TO THERMOSTATIC CONTROL COMPANY, OF BOSTON, MASSACHUSETTS, A CORPORATION OF MASSACHUSETTS

SHOCK ABSORBER

Original No. 1,686,381, dated October 2, 1928, Serial No. 42,534, filed July 9, 1925. Application for reissue filed December 17, 1931. Serial No. 581,766.

The present invention relates to shock absorbing devices, and more particularly to apparatus of this character embodied in motor vehicles and designed to absorb shocks due to inequalities in the surface of the roadway.

Many different types of shock absorbing devices have been designed for use in connection with motor vehicles. In general these devices may be grouped in three classes, those which control the movement of the chassis, more particularly the rebound, through spring controlled check members, apparatus which controls the movement of the chassis through the use of an air controlled dash-pot or similar construction, and devices which control movement of the chassis through a liquid impelled from one chamber to another by a piston. When the various factors entering into the efficiency of such a construction are considered, more generally the cost of manufacture and the results accomplished by the construction, it is probable that the liquid type of shock absorber ranks first. This type of shock absorber, however, varies in its operation with differences in temperature, more particularly the marked differences which exist between the summer and winter temperatures of the northern climate. I have discovered that this variation in the operation of the shock absorber is due to changes in the viscosity of the liquid and that this change in viscosity may be sufficiently great to seriously impair the efficiency of the shock absorber with temperature differences of 40° F. or 50° F.

Accordingly, one object of the present invention is to provide a new and improved type of liquid shock absorber which will operate with the maximum efficiency and under widely varying temperature conditions.

A further object of the invention is to reorganize and improve shock absorbers of the liquid type in a manner to render such absorbers more positive and effective in their action and preclude the possibility of improper adjustment in the hands of the unskilled mechanic or user.

With these and other objects in view, the various features of the invention consist in certain novel features of construction, combinations and arrangements of parts hereinafter described and claimed, the advantages of which will be obvious to those skilled in the art from the following description.

Figure 5:
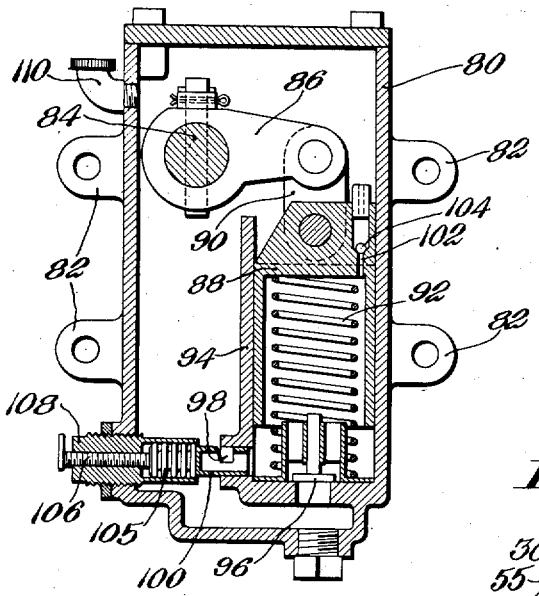
Figure 2:
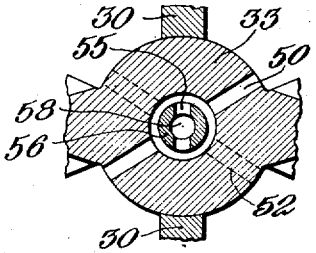
Figure 1:
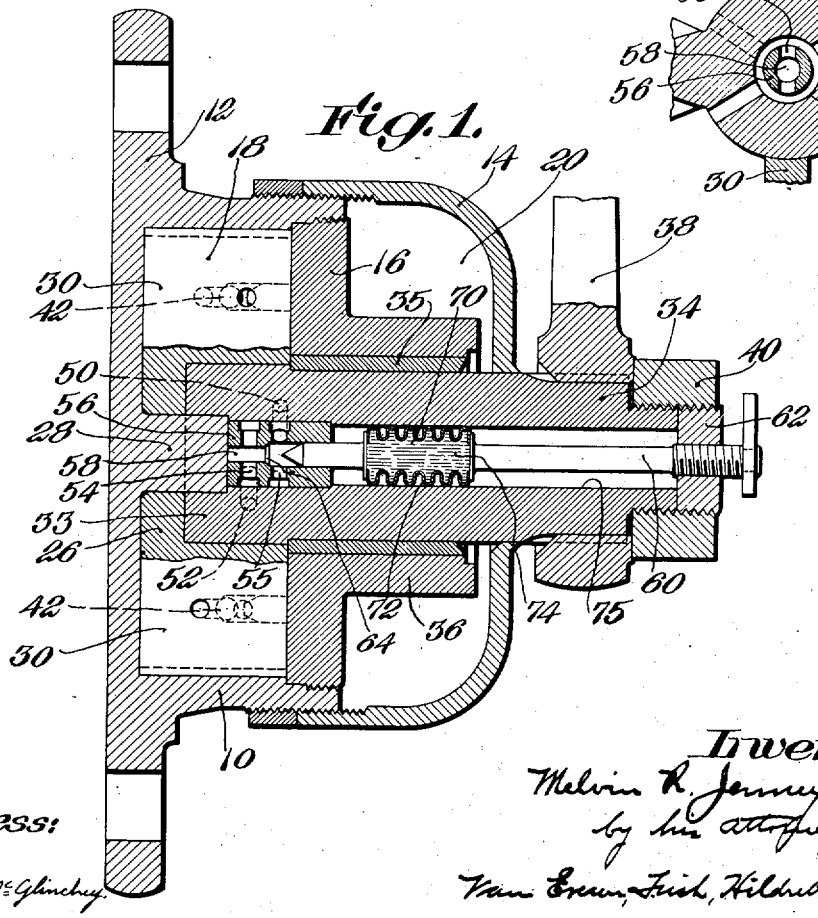

In the accompanying drawings illustrating the preferred form of the invention, Fig. 1 represents a sectional plan view of a well known type of shock absorber embodying the features of the present invention; Fig. 2 is a detail illustrating a section of the shock absorber shown in Fig. 1; and Fig. 3 is a section in elevation of a different type of shock absorber also embodying the features of the invention.

According to the present invention, the shock incident to meeting with an inequality in a roadway is cushioned by the passage of liquid from one chamber to another through a relatively small orifice or opening. The size of this passage is adjusted in accordance with the weight of the vehicle and the character of the liquid employed in the shock absorbing device. Furthermore, having initially adjusted the passage in accordance with these factors in a manner to secure the best riding qualities, the area or size of the orifice or passage is thereafter controlled automatically and varied in accordance with variations in the temperature of the cushioning liquid. In other words, when the liquid is at the upper limit of temperature and flows most readily, the opening or size of the passage is least, and as the temperature of the liquid is lowered and the viscosity increased, the size of the opening is accordingly increased to render the operation of the device uniform and independent of changes in temperature. To this end, the present invention contemplates the employment of a valve controlling the passage of the absorbing liquid from one chamber to another, this valve being directly connected with a thermostat which is located and arranged in a manner to assume the temperature of the surrounding liquid.

The shock absorber illustrated in Figs. 1 and 2 of the drawings is of the general type disclosed in the patents to Houdaille No. 933,076 and Shultz No. 1,426,115. This shock absorber comprises an annular casing 10 provided with a base portion 12 for attachment to a vehicle frame and externally threaded to receive a cover 14. Mounted within the casing is a head 16 which divides the interior into two separate chambers 18 and 20, each of which is supplied with a cushioning liquid such as oil or glycerine. The chamber 18, which is conveniently termed the pressure chamber, is divided transversely by a partition member comprising a central hub 26 mounted on a projecting boss 28 formed integral with the base 12. The hub is provided with two radial fin portions 30 locked in slots formed in opposite sides of the casing and forming a liquid-tight partition extending transversely thereof. The chamber 20, which may be termed a replenishing chamber, communicates with the pressure chamber to keep the latter constantly supplied with cushioning liquid. Received within the pressure chamber and closely engaging the walls thereof are pistons or movable members formed integral with a hub 33 journaled on the end of the boss 28. The hub 33 is formed as a part of a hollow shaft 34 journaled in a bushing 35 which is received in a bearing portion 36 of the head 16, as indicated clearly in Fig. 1. Keyed to the shaft 34 is an arm 38 connected in the usual manner with the motor vehicle and designed to oscillate in accordance with spring flexure. The arm is retained in place on the shaft by a lock nut 40. The abrupt movements of the spring are checked or dampened through the dash-pot effect created by the movements of the pistons in the pressure chamber. A reasonably free movement in one direction of the pistons is provided for through the employment of ball check valves 42. Movement of the pistons in the opposite direction is controlled in accordance with the rate of flow of the cushioning liquid from one chamber to another. Upon the return movement of the pistons, the check valves are closed and the liquid is compelled to flow through passages 50 and 52 formed in the hub 33 communicating with each pair of chambers. Communication between the chambers is afforded by two sets of radial ports 54 and 55 formed in a valve plug 56. The two sets of ports are in constant communication with the transverse passages 50 and 52 communicating with one another through a central bore 58. The rate of flow of the cushioning liquid through the passage is controlled by a metering pin 60 threaded in a head 62 which in turn is threaded within the lock nut 40. By properly adjusting this metering pin with relation to the seat 64, shock absorbing action may be properly adjusted with respect to load. In addition to this manual adjustment for different sizes and weights of vehicles, the rate of flow of the liquid is automatically maintained constant, irrespective of the viscosity of the liquid, through a thermostatic element 70, which, in the present invention, consists of a metallic bellows 72 forming a part of the metering pin 60 and filled with a fluid 74 which expands and contracts with variations in temperature. As the temperature increases, the expansion of the fluid elongates the metering pin, restricts the passage, and compensates for the decreased viscosity of the cushioning liquid in warmer weather. On the contrary, as the temperature drops, the metallic bellows contract with the consequent contraction in length of the metering pin and an increase in size of the passage to compensate for increased viscosity of the cushioning liquid. By properly gauging the length of the metallic bellows and employing a suitable fluid therein, the metering pin can be caused to automatically adjust the size of the passage to compensate for the changes in the rate of flow otherwise due to changes in viscosity of the cushioning liquid. The metallic bellows preferably fit within the axle bore 75 of the shaft 34 and are prevented from distortion through engagement with the surrounding wall of the bore. Although different fluids or gases may be employed within the hermetically sealed bellows, it is considered preferable to employ glycerine or a substance similar in its characteristics to the fluid employed within the shock absorbers. The opposite ends of the metallic bellows may be hermetically sealed in any known manner, as through the use of solder or suitably shaped heads which rigidly clamp the ends of the bellows in a manner to seal them.

A somewhat different form of vehicle shock absorber is illustrated in Fig. 3. In this form, a vertical casing 80 is attached to the vehicle frame through lugs 82 and is provided with a transverse shaft 84 extending through the casing and connected within the casing to an arm 86 which in turn is connected with a plunger 88 through a short link 90. The plunger and arm are normally maintained in approximately the position shown through a spring 92. The plunger slides within an open cylinder 94 formed within the casing, as indicated. Upon an upward movement of the plunger through a movement of the arm 86, liquid is permitted to pass freely from the outer chamber into the chamber beneath the plunger through a gravity operated check valve 96. The return movement of the plunger is checked by the liquid therebeneath which is compelled to flow from the inner chamber to the outer through a slot 98 formed in a sleeve valve 100 as well as through a restricted orifice 102 controlled by a ball check valve 104 seated in the upper portion of the plunger, as indicated. The delay caused by the flow of liquid through these restricted passages dampens or checks the otherwise abrupt movements of the plunger due to spring flexure. The sleeve valve 100 having the opening 98 formed therein is provided with a thermostatic control indicated at 105 and with a manual control through the stem 106 threaded in a nut 108, which in turn is threaded in the casing. The manual adjustment permits regulation of the opening for different loads and the employment of the metallic bellows ordinarily compensates for variations in the viscosity of the cushioning liquid. The oil within the casing may be replenished by a filler pipe 110.

What is claimed is:—

1. A shock absorber for motor vehicles comprising a casing having a chamber adapted to contain a cushioning liquid, a shaft projecting within the casing, an arm connected to the shaft and adapted to oscillate the latter upon spring flexure, a piston connected with the shaft, a partition having a valve controlled orifice through which the cushioning liquid is forced by working movement of the piston, a bellows thermostat, and metering means connected with the thermostat and movable directly with expansion and contraction thereof for automatically adjusting the size of the orifice in accordance with variations in temperature of the cushioning liquid in the chamber.

2. A shock absorber for motor vehicles comprising a chamber adapted to contain a cushioning liquid, a partition having an orifice through which liquid is forced from one portion of the chamber to another, means for forcing the liquid through the orifice, a bellows thermostat, and a metering member connected thereto and movable thereby for varying the size of the orifice to vary the resistance to flow of the liquid therethrough to compensate for viscosity changes in the liquid caused by changes in temperature.

3. In a shock absorber for motor vehicles, the combination with a liquid container having a by-pass passageway of a metering member for controlling one of the ports connecting said by-pass passageway with said container, and a bellows thermostat directly connected to said metering member to control the opening of said communicating port by lengthwise movement of the metering member to preserve uniform displacement of liquid under all temperatures.

4. A shock absorber for motor vehicles comprising in combination with an operative connection a liquid container and a member movably arranged therein and connected to said connection, there being a suitable by-pass passageway provided to permit flow of liquid from one side of said movable member to the other, of a metering pin in said passageway for regulating and controlling the flow of liquid therethrough, and a bellows thermostat for operating said metering pin in accordance with the prevailing temperature.

5. A shock absorber for motor vehicles comprising in combination a liquid container, a member movably arranged therein and operatively connected to a spring mechanism which it is desired to control, a by-pass connection communicating with said container to by-pass liquid on the opposite sides of said movable member, a metering valve pin for controlling the passage through said by-pass connection, and a bellows thermostat for adjusting said metering valve pin in said by-pass connection to control the volume of liquid passing through said by-pass connection in accordance with the temperature.

6. A shock absorber for motor vehicles comprising in combination an actuating member, a fluid container, a piston movably arranged therein and operatively connected to said actuating member, a by-pass connection for by-passing the fluid on opposite sides of said piston when the latter is operated on the working stroke, a metering valve member interposed in said by-pass connection to control the passage of fluid therethrough, a bellows thermostat, and operative connections between said bellows thermostat and said metering valve member for adjusting the latter in accordance with the temperature.

7. A shock absorber for motor vehicles comprising a casing having a chamber adapted to contain a cushioning liquid, a shaft projecting within the casing, an arm connected to the shaft and adapted to oscillate the latter upon spring flexure, a piston connected with the shaft, a partition having an orifice through which liquid is forced from one portion of the chamber to another upon the working stroke of the piston, metering means for controlling liquid flow through the orifice, a bellows thermostat directly connected to the metering means to automatically adjust the orifice in accordance with changes in temperature, and means for adjustably supporting the bellows thermostat at its outer end.

MELVIN R. JENNEY.